United States Patent [19]

Bour et al.

[11] 4,309,530

[45] Jan. 5, 1982

[54] TWO STAGE PROCEDURE FOR THE PREPARATION OF POLYPYRROLIDONE

[75] Inventors: Edmond H. J. P. Bour, Limbricht; Johannes A. L. Brouwers, Echt; Jean M. M. Warnier, Urmond, all of Netherlands

[73] Assignee: Stamicarbon, B.V., Geleen, Netherlands

[21] Appl. No.: 113,286

[22] Filed: Jan. 18, 1980

[30] Foreign Application Priority Data

Jan. 19, 1979 [NL] Netherlands .......................... 7900425

[51] Int. Cl.[3] .............................................. C08G 69/24

[52] U.S. Cl. .................................... 528/326; 528/312; 528/317; 526/65

[58] Field of Search ........................ 528/326, 312, 317

[56] References Cited

U.S. PATENT DOCUMENTS 4,017,465 4/1977 Bacskai .............................. 528/326

*Primary Examiner*—Harold D. Anderson

*Attorney, Agent, or Firm*—Cushman, Darby & Cushman

[57] ABSTRACT

Polypyrrolidone polymers and copolymers are obtained by polymerizing 2-pyrrolidone, optionally with another lactam, in the presence of a catalyst and accelerator, first in the mass until at least 10% of the monomer is converted but the reaction product is still capable of suspension, then completing the desired degree of polymerization by suspending the reaction mixture in an inert liquid dispersion agent that does not dissolve the desired polymer. Relatively high molecular weight polymers are prepared in a short amount of time using this two-stage procedure.

6 Claims, No Drawings

TWO STAGE PROCEDURE FOR THE PREPARATION OF POLYPYRROLIDONE

BACKGROUND OF THE INVENTION

The present invention relates to a process for the preparation of polypyrrolidone by the polymerization of 2-pyrrolidone with one or more anionic catalysts and one or more polymerization accelerators.

As is already known, 2-pyrrolidone can be polymerized in the mass or in suspension in an inert liquid dispersion agent in which the polymer to be formed is totally insoluble or only slightly soluble. In the first case a lump of solid polymer is obtained or, if polymerization is carried out with stirring and monomer conversion is restricted, a crumbly polymer is produced. In the second case a granular or pulverulent polymer is produced. In all cases the polymer thus formed must be washed so as to remove unconverted monomer and catalyst residues. As a result of the required washing the polymerization is preferably carried out in suspension, because the product thus formed is more easily washed out.

From our own investigations the fact has emerged that on the one hand for the same polymerization period, in most cases polymerization in the mass gives higher conversions, while on the other hand polymerization in suspension gives a polymer with a higher molecular weight. The object of the present invention is a process for the polymerization of pyrrolidone, whereby—in as short a time as possible—a granular or pulverulent polymer is obtained having a molecular weight which is at least as great as that achieved using conventional procedures.

DETAILED DESCRIPTION OF THE INVENTION

In accordance with the present invention these and other objects are achieved by polymerizing pyrrolidone, possibly mixed with up to 25 mol %, based on the pyrrolidone, of another copolymerizable lactam, with one or more anionic catalysts and one or more accelerators as may be required wherein the polymerization is carried out in two stages. According to this invention the monomer is initially polymerized in a first stage (A) and the polymerization in the mass is conducted until a conversion of at least 10% has been achieved. Then while the reaction mass is still capable of being suspended in a liquid, the polymerization is then continued in a second stage (B) by suspending the reaction mixture in an inert liquid dispersion agent in which the polymer to be formed is insoluble, the polymerization then being continued until the desired degree of monomer conversion and polymer molecular weight have been attained.

The advantage of the procedure in accordance with the present invention is that within a relatively short time satisfactory conversion is achieved, while the molecular weight of the polymer is undoubtedly just as high and frequently is higher than that of polymers prepared by total mass polymerization or total suspension polymerization. The product so formed is easy to wash out to remove unconverted monomer and catalyst residues. Another advantage is that during stage B no polymer, or if at all substantially less polymer, is deposited on the walls and on the stirrer than with total suspension polymerization.

In stage A the polymerization is carried out in the mass until a conversion of at least 10% is achieved. By conversion is meant the percentage by weight of the monomer employed which is converted into the polymer. Polymerization in the mass here means polymerization whereby, apart from the reactants, not more than roughly 15 vol. %, based on the volume of the reactants, of a liquid dispersion agent or other liquid is present. It is preferable that no dispersion agent or other liquid is present.

In order to benefit fully from the relatively rapid increase in conversion which occurs during mass polymerization, polymerization during stage A is preferably continued until a conversion of at least 20% of the monomer is obtained. In all cases stage A is terminated before polymerization has progressed to such an extent that the reaction mass can no longer be suspended in a liquid. With roughly 10–15% conversion, the reaction mass is still a viscous liquid which can be dispersed in the dispersion agent using known techniques. Where conversion exceeds roughly 20% the reaction mass is a solid. By conducting the mass polymerization with stirring, however, a crumbly mass is obtained which, by means of stirring, can easily be suspended in the form of small particles in the dispersion agent. By regulating the residence time in stage A, and as a consequence the conversion taking place in stage A, it is possible to influence the final conversion and molecular weight obtained.

When the conversion in stage A is maintained at a low level there is eventually obtained a relatively high molecular weight polymer with relatively low conversion. By increasing the conversion in stage A, one obtains a polymer with a somewhat lower molecular weight and a somewhat higher conversion. Polymerization in the mass can be carried out in a container without an agitator, after which a transition is made to suspension polymerization by either placing the reaction mass in a stirred container with dispersion agent, or by adding dispersion agent to the reaction mass, and then suspending the mass by intense agitation. Stage A can also be executed in a ball mill. With a continuous process, in accordance with the present invention polymerization can be undertaken in the mass and in a tube, not provided with in-line mixers, or in an extruder.

After the first stage has been completed the reaction mass is suspended in an inert liquid dispersion agent. This can take place either by adding the dispersion agent with stirring to the reaction mass, or conversely by placing the reaction mass in a reactor filled with dispersion agent. The reaction mass can be supplied in the form of a single flow or a number of flows. A plurality of flows is used for example if, with a continuous process, several tubular reactors in which the mass polymerization is carried out are connected to one reactor for suspension polymerization. Also the reaction mass and the dispersion agent can be fed jointly through equipment suitable for the production of suspensions, e.g., by means of a colloid mill or an in-line mixer. The addition of dispersion agent to the reaction mass can be accomplished either by supplying the entire quantity of disperson agent in one shot, or by adding the dispersion agent in stages.

If required, during polymerization in suspension, ancillary substances can be present which counteract and control the growth of the polymer, such as for example finely divided polyamides or other organic or inorganic solid substances, alkali stearates or other salts of fatty acids. However from our experience the fact has emerged that even in the absence of these ancillary substances, in the procedure in accordance with the present invention no deposition, or hardly any deposition, of polymer or lump formation on the reactor walls or parts occurs.

Various inert liquid dispersion agents useful for the suspension polymerization portion of the process of the invention are primarily the saturated aliphatic and cyclo-aliphatic hydrocarbons containing 5 to 20 carbon atoms, such as pentane, hexane, cyclohexane, heptane, octane, dodecane, pentamethyl-heptane and the like as well as benzene fractions with well-defined boiling point curves. It is also possible to use other inert liquids such as, inter alia, toluene and tetrahydrofuran. Generally, between about 1.5 and 3 parts by volume of dispersion gent are employed per part by volume of the reaction mass.

Stages A and B can be executed at the same temperature or at mutually different temperatures depending on conditions and equipment employed. During the homopolymerization of 2-pyrrolidone, a temperature between about 20° C. and about 70° C. and preferably between about 35° C. and about 55° C. is employed. During copolymerization a somewhat higher temperature can be used. If a mixture of 2-pyrrolidone, catalyst and accelerator is prepared in a separate supply vessel, it is recommended that the mixture be kept at a temperature of a least 100° C., and preferably 115°-120° C., so as to prevent premature polymerization.

The pressure at which the reaction is carried out has so far as is known no influence on the polymerization process. In the majority of cases roughly atmospheric pressure is employed which is both convenient and economical. Higher pressures can certainly be used and will also be encountered if mass polymerization is carried out in an extruder or tubular reactor, or if a low-boiling-point dispersion agent is employed.

Catalysts and accelerator systems employed in the process of the present invention are generally of the type already known in the art. Thus, as the catalyst system one may use any of the known catalysts such as alkali lactamates, quaternary ammonium lactamates, compounds which react in situ with pyrrolidone to form these lactamates, and quaternary ammonium compounds of inorganic acids of acid compounds. Generally, the catalyst concentration is between 0.1 and 10 mol. %, based on the pyrrolidone monomer. Mixtures of catalysts can also be used.

As the accelerator there can be used or more compounds which, on their own or mixed with another accelerator, are capable, in the presence of the catalyst, of converting the pyrrolidone into a thermostable, spinnable polymer. Particularly suitable are carbon dioxide, sulfur dioxide and N-(2 caprolactam) -ε- caprolactam. The accelerators can generally be used in a concentration between about 0.01 and about 10 mol % based on the monomer. Preferably, the accelerator is employed in a concentration of between about 0.1 and about 3.0 mol %.

The overall time required to execute both stage A and stage B depends on several factors including the temperature, the nature and quantity of the catalyst and accelerator, the degree of conversion required in stage A and the final conversion figure and molecular weight required for the overall process. Normally, the time required for stage A will be between five minutes and four hours. Particularly, when employing a large quantity of catalyst and/or a very active catalyst-accelerator combination, a time of between five minutes and one hour should be chosen. By contrast, with a lower catalyst concentration and/or a relatively less active polymerization system, a somewhat longer time can be employed. Polymerization times exceeding four hours in stage A are possible, but frequently lead to a lower molecular weight product. The time required for stage B is at least one hour and is preferably between one and ten hours. Longer periods are possible but appear to offer little advantage to the overall process. In many cases, it is sufficient to employ a period of between two and six hours. Preferably, the reaction conditions should be so selected that the final conversion is at least 50% and preferably 60% or more.

When using $CO_2$ or $SO_2$ as the accelerator, the conditions must be so chosen that the end product has a molecular weight of at least 250,000 and preferably at least 400,000 ($\eta_{rel}$ respectively 20 and 40). When using an accelerator such as N-(2-caprolactam)-ε-caprolactam, the conditions should be so selected that a product having a molecular weight of between 20,000 and 120,000 ($\eta_{rel}$ as 2.25 and 7.0 respectively) and preferably at least 45,000 ($\eta_{rel}$ 3.0) is obtained. As previously indicated, the molecular weight of the polymer desired will influence the type of catalyst/accelerator system employed.

The entire polymerization process is carried out in the absence of interfering compounds such as water, lower alcohols and amino compounds which are excluded from the process. It is far preferable to start with a 2-pyrrolidone which is as pure as possible. As indicated, it is possible to employ a mixture of pyrrolidone with up to 25 mol. %, based on pyrrolidone, of a copolymerizable lactam such as ε-caprolactam.

The present invention will not be explained with reference to the following examples, without being restricted to the embodiments described therein.

EXAMPLE 1

2-pyrrolidone was polymerized with potassium pyrrolidonate as the catalyst and N-(2-caprolactam)-ε-caprolactam as the accelerator.

In stage A, pyrrolidone (100 g) mixed with the catalyst and accelerator was polymerized in the mass for a given time as indicated below at an elevated temperature while being slowly stirred. In all cases this stage gave a particular reaction mass which resembled of moist sand. The conversion obtained at this stage was at least 15%.

In stage B, the reaction mass from the previous stage, with the temperature kept constant, was dispersed with stirring into pentamethyl heptane (200 ml) after which polymerization was then continued for the period of time indicated below as a suspension polymerization process. Thereafter, the polymer so formed was filtered off, washed with water and dried at 75° C. under reduced pressure. The entire polymerization process was carried out in a dry nitrogen atmosphere. A series of four tests were run and during test 1-3 the temperature in both stages A and B was 50° C., and during test 4 it was 30° C. The relative viscosity (20° C., 1 g polymer in 100 ml of 96% sulfuric acid) of the product obtained after stage A was determined by measuring a sample. Similar determinations were made for both the ultimate conversion and relative viscosity of the product obtained during stage B. The reaction conditions and results are given in Table 1.

TABLE 1

| Test No. | catalyst mol. % | KV** | Time in hours Stage A | Time in hours Stage B | η rel. Stage A | η rel. Stage B | % Conversion |
|---|---|---|---|---|---|---|---|
| 1 | 2.50 | 4 | 3.5 | 6.0 | 3.7 | 4.3 | 62 |
| 2 | 3.75 | 4 | 1.1 | 6.9 | 3.7 | 4.3 | 70 |
| 3 | 5.14 | 4 | 0.75 | 5.25 | — | 3.6 | 64 |
| 4* | 2.50 | 4 | 4.0 | 5.5 | 4.3 | 5.2 | 27 |

*This test was made at 30° C.
**Molar ratio between catalyst and accelerator.

EXAMPLE 2

In the same manner as described in Example 1, pyrrolidone (586 g) that had been subjected to extra purification by repeated distillation (commercially available from GAF Corporation) was polymerized with potassium pyrrolidonate (3.8 mol. %) as the catalyst and N-(2-caprolactam)-ε-caprolactam (1.04 mol. %) as accelerator. Polymerization was carried out at 50° C. for 0.5 hours in the mass, after which pentamethyl heptane (1,000 ml) was added as the dispersant and polymerization was continued at the same temperature subject to stirring as a suspension polymerization for 2.5 hours. The polymer obtained had a relative viscosity of 3.8 with a conversion of 44%.

EXAMPLE 3

The procedure of Example 2 was carried out twice in the same manner and in both such cases a polymer having a relative viscosity of 3.8 was obtained with conversions of 40% and 47%, respectively.

EXAMPLE 4

The procedure of Example 2 was repeated yet again, but this time the dispersion agent was added in portions of roughly 100 ml during 20 minutes, commencing 10 minutes after the start of polymerization in the mass. Conversion was increased to 52% and the relative viscosity was 4.1.

From these tests only, it can be seen that with a total polymerization time of 3 hours satisfactory conversion can be obtained. Further, it will be noted that by extending the polymerization time in the second stage the conversion can be increased without a significant reduction in the relative viscosity of the resulting polymer.

Comparative tests

For purposes of comparison polymers were prepared by polymerization at 50° C. exclusively in the mass or exclusively in suspension and identified as tests 5–7 shown in Table 2. From these comparative tests it can be seen that the procedure in accordance with the present invention, as compared with suspension polymerization, gives a higher yield and a molecular weight which is at least as high and—as compared with polymerization in the mass—gives a higher molecular weight with a sometimes lower conversion figure.

| Test No. | Type | Cat. mol. | K/V | Time, hours | η rel. | % Conversion |
|---|---|---|---|---|---|---|
| 5 | Suspension | 2.5 | 4 | 8.0 | 3.4 | 48 |
| 6 | Suspension | 2.5 | 4 | 10.5 | 3.2 | 58 |
| 7 | Mass | 2.5 | 4 | 9.5 | 3.1 | 70 |

What is claimed is:

1. In a process for preparing a solid, particulate polymer from a 2-pyrrolidone monomer composition comprising 2-pyrrolidone and 0–25 mol %, based on 2-pyrrolidone, of a different copolymerizable lactam, with at least one polymerization catalyst and at least one polymerization accelerator, the improvement comprising polymerizing said monomer composition in two distinct stages, wherein:

(1) in a first stage, 2-pyrrolidone monomer composition is polymerized in the mass whereby, apart from the reactants, not more than roughly 15 volume %, based on the volume of the reactants, of a liquid dispersion agent or other liquid is present, for a period of between 5 minutes and 4 hours until the conversion of the monomer composition is at least 10% to form a reaction mass which is capable of being suspended in a liquid, and thereafter, (2) in a second stage, suspending the reaction mass in an inert liquid dispersing agent in which the polymer of 2-pyrrolidone is insoluble, and continuing the polymerization of the reaction mass until the particulate polymer is formed.

2. The process according to claim 1, wherein the polymerization in the first stage is conducted until at least 20% of the monomer is converted.

3. The process according to claim 1, wherein the polymerization time in the first stage is between 5 minutes and 1 hour.

4. The process according to claim 1 or 2, wherein the polymerization time in the second stage is at least 1 hour.

5. The process according to claim 4, wherein the polymerization time in the second stage is between about 2 and about 6 hours.

6. The process according to claim 1, wherein the temperature of the polymerization in the first stage is substantially identical to the temperature of the polymerization in the second stage.

* * * * *